United States Patent [19]
Kaars

[11] Patent Number: 5,999,216
[45] Date of Patent: Dec. 7, 1999

[54] TRANSMISSION AND RECEPTION OF TELEVISION PROGRAMS AND AN ADDITIONAL DATA SERVICE

[75] Inventor: Peter B. Kaars, Eindhoven, Netherlands

[73] Assignee: U.S. Philips Corporation, New York, N.Y.

[21] Appl. No.: 08/972,508

[22] Filed: Nov. 18, 1997

[30] Foreign Application Priority Data

Nov. 21, 1996 [EP] European Pat. Off. ............. 96203227

[51] Int. Cl.$^6$ ........................................................ H04N 7/58
[52] U.S. Cl. ........................... 348/385; 348/564; 348/473
[58] Field of Search .................................. 348/473, 385, 348/388, 564, 565, 705, 706, 588

[56] References Cited

U.S. PATENT DOCUMENTS

| | | | |
|---|---|---|---|
| 4,876,600 | 10/1989 | Pietzsch et al. | 348/588 |
| 5,040,067 | 8/1991 | Yamakazi | 348/588 |
| 5,161,012 | 11/1992 | Choi | 348/564 |
| 5,247,365 | 9/1993 | Hakamada et al. | 348/588 |
| 5,537,153 | 7/1996 | Shigihara | 348/564 |
| 5,612,742 | 3/1997 | Krause et al. | 348/385 |
| 5,621,463 | 4/1997 | Lyons et al. | 348/387 |
| 5,633,683 | 5/1997 | Rosengren | 348/385 |

*Primary Examiner*—Victor R. Kostak

[57] ABSTRACT

A method and arrangement are disclosed for transmitting television programs via a plurality of channels, and an additional data service, for example, an Electronic Program Guide, via a selected television channel. While processing and displaying the program guide, prior art television receivers cannot continue the reproduction of a currently received TV program because the program is generally transmitted via a different channel. The invention provides a solution to this problem by duplicating a signal component representing, for example, the audio contents of the various television programs in said selected television channel. This allows customers to keep up with the service they were watching before, and to immediately return to the program if something of interest appears to happen. The invention is particularly applicable in Digital Video Broadcast (DVB) systems where each channel can accommodate a plurality of TV programs.

10 Claims, 2 Drawing Sheets

TRANSMISSION AND RECEPTION OF TELEVISION PROGRAMS AND AN ADDITIONAL DATA SERVICE

BACKGROUND OF THE INVENTION

1. Field of the Invention

The invention relates to a method and arrangement for transmitting television programs via a plurality of channels, and additional data services via a selected one of said channels. The invention also relates to a method and arrangement for receiving said television programs and additional data service. The invention is particularly, but not exclusively, applicable in Digital Video Broadcast systems.

2. Description of the Related Art

In Digital Video Broadcasting (DVB) systems, a plurality of television programs is accommodated in an MPEG transport stream which is transmitted via a satellite, cable, or terrestrial channel. A DVB delivery system comprises a plurality of such channels.

Along with the television programs, additional services are provided. An example of an additional service is an electronic program guide (EPG). Such a program guide comprises program schedule information relating to the television programs that are transmitted by the delivery system. The program schedule information may be distributed through multiple channels, or completely transmitted in a selected one of said channels.

In order to receive, process, and display an additional service such as the program guide, the receiver (usually, a set-top box) needs to be tuned to the specific channel in which the program guide is transmitted. Generally, this channel is different from the channel to which the receiver is currently tuned. Consequently prior art receivers cannot continue the reproduction of a television program when the program guide is being accessed.

SUMMARY OF THE INVENTION

It is an object of the invention to provide an improved method and arrangement for transmitting additional data services.

In accordance with the invention, the method is characterized by the steps of transmitting, in said selected television channel, a signal component of the television programs which are transmitted in other channels, and transmitting data to identify, for each television program, the location of said signal component in said selected channel. By thus duplicating a signal component in the television channel comprising the additional service, the signal can be reproduced simultaneously with that particular service. The "replacement" signal enables a customer to keep up with a currently transmitted television program while consulting a program guide. The customer keeps informed about the TV program and can immediately switch back to this program as soon as something of interest happens therein.

The data identifying the location of the signal components in the selected channel allows a receiver to determine which signal component originates from the TV program that was being watched prior to accessing the additional data service. The identification data for all TV programs can be collectively transmitted via a single channel, for example, via the selected channel along with the signal components and the program guide. The identification data can also be distributed through multiple channels. For example, each channel may accommodate the data for the TV programs that are transmitted in this channel.

The signal component accompanying the additional data service may be an audio signal component of the television program. The program's audio signal (or one of the program's audio signals if there is more than one) requires a moderate amount of bandwidth and provides an adequate impression of what is happening in the program. The signal component may also be the video signal component of the television program. The required bandwidth can be reduced by transmitting a reduced-quality version of the signal component. Even a sequence of small, possibly black-and-white, regularly updated still pictures of the television program suffices to give the customer an adequate impression of what is happening in the "real" program.

DETAILED DESCRIPTION OF THE PREFERRED EMBODIMENTS

Figure 1:
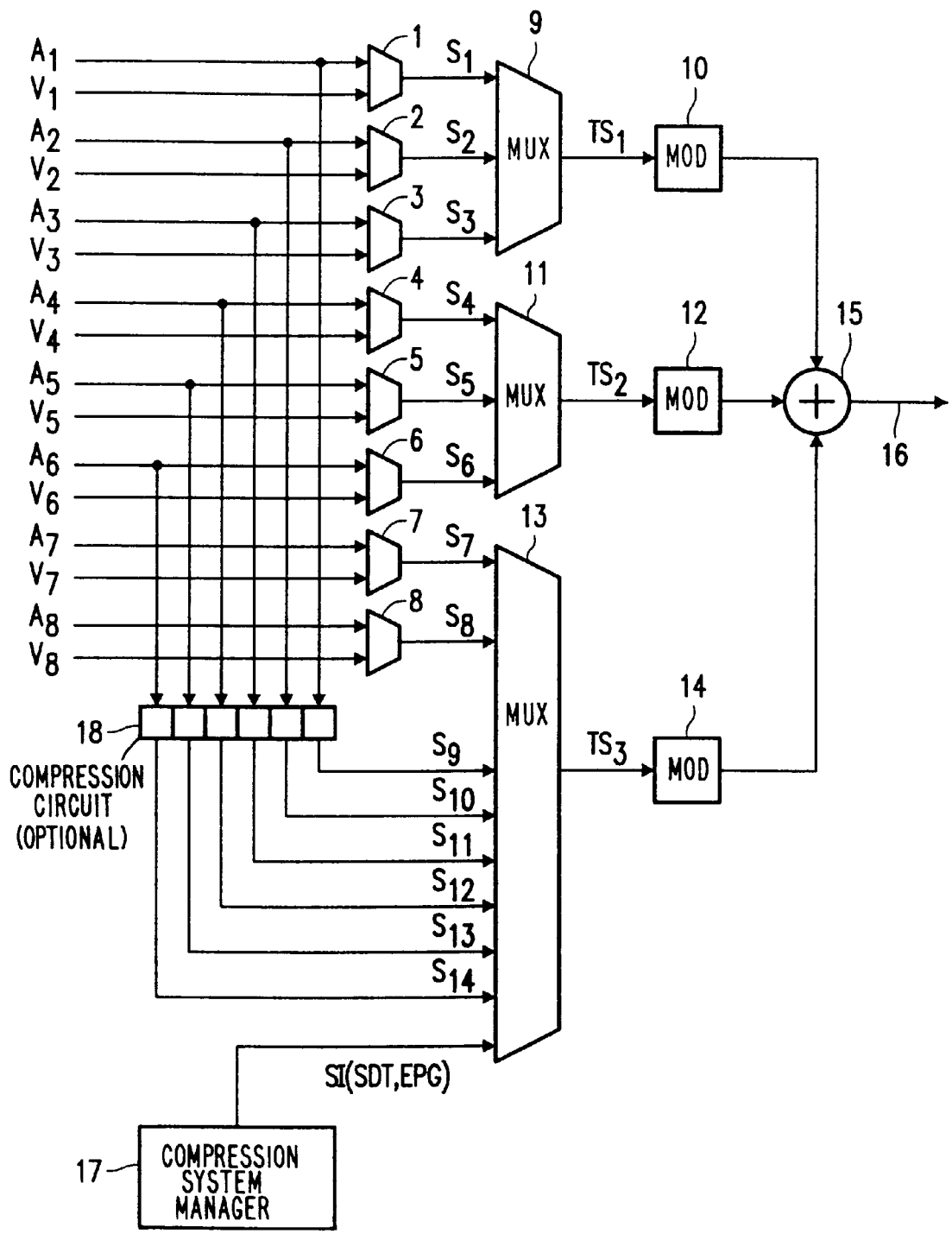
FIG. 1 shows an arrangement for transmitting a plurality of television programs in accordance with the invention.

FIG. 1 shows an arrangement for transmitting a plurality of television programs in accordance with the invention. Typically, each television program comprises a video signal, one or more audio signals, and an auxiliary data signal (for example, teletext). In the embodiment shown, the arrangement transmits eight television programs each having one audio signal and one video signal. The digital audio signals are applied in the form of elementary MPEG bitstreams $A_1 \ldots A_8$, the digital video signals are applied in the form of MPEG elementary bitstreams $V_1 \ldots V_8$.

The audio and video signals are pairwise applied to multiplexers 1 . . . 8 and combined therein to form respective television programs or "services" $S_1 \ldots S_8$. A plurality of services (typically, 5 to 10) fit in the bandwidth of a channel. In the embodiment shown, a multiplexer 9 combines the services $S_1 \ldots S_3$ into a transport stream $TS_1$ which is modulated on a carrier a by modulator 10. A multiplexer 11 combines the services $S_4 \ldots S_6$ into a transport stream $TS_2$ which is modulated on a carrier by a modulator 12. A multiplexer 13 combines the services $S_7, S_8$ into a transport stream $TS_3$ which is modulated on a carrier by a modulator 14. The modulated carriers are combined in a mixer 15 and applied to a transmission medium 16. The transmission medium may be a satellite link, a cable, an ATM network, etc.

The arrangement further comprises a Compression System Manager 17 which controls the multiplexers and adds service information SI to the transmitted services. In the present embodiment, the service information is accommodated in a selected one of the transport streams, viz. $TS_3$. The service information includes, inter alia, service description tables (SDT) which identify, for each delivered service, the relevant transport stream $(TS_j)$ within the network, the service $(S_i)$ within this transport stream, and the name of the service. In the present example, the service information further includes an electronic program guide (EPG).

In accordance with the invention, the arrangement further provides the transmission, in the selected transport stream $TS_3$, of the audio signal component of the television programs accommodated in $TS_1$ and $TS_2$. To this end, the digital audio signals $A_1 \ldots A_6$ are also applied to multiplexer 13.

By virtue of the service description tables issued by the compression system manager 17, the audio signals are also defined to be independent services $S_9 \ldots S_{14}$.

Figure 2:
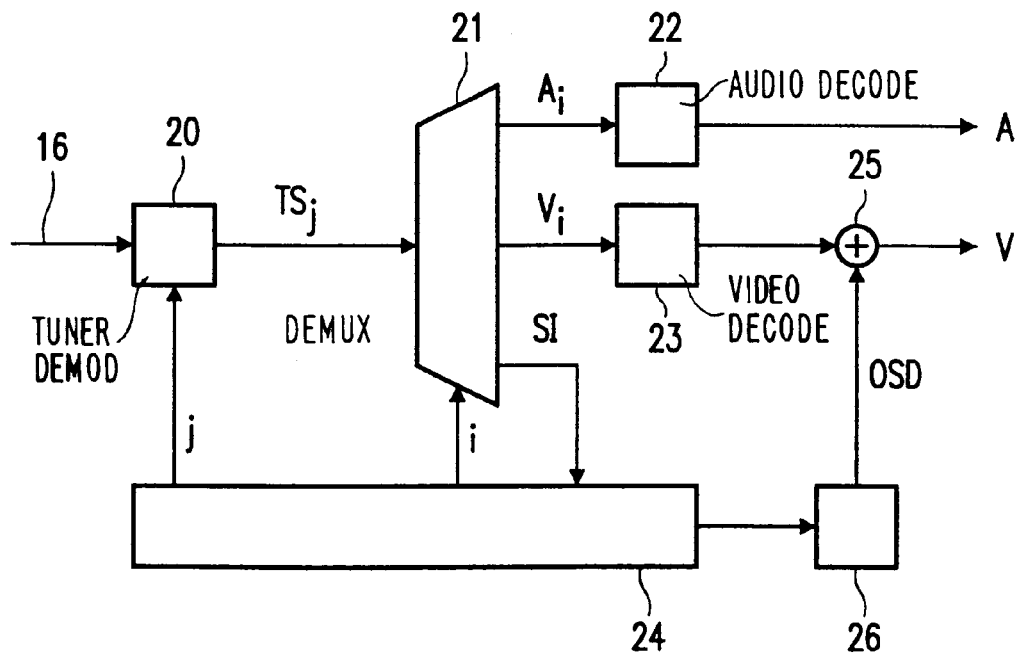
FIG. 2 shows a television receiver in accordance with the invention.

FIG. 2 shows a diagram of a receiver in accordance with the invention. The receiver comprises a tuner/demodulator 20 for demodulating a desired transport stream $TS_j$, a demultiplexer 21 for selecting the elementary audio stream $A_i$ and video stream $V_i$ of a desired service $S_j$, an MPEG audio decoder 22, an MPEG video decoder 23, and a control circuit 24. In an initial operation mode, the control processor has received and stored the service description tables described above.

To receive and reproduce a desired television program service $S_i$ which is accommodated in transport stream $TS_j$, the control circuit applies the relevant transport stream identifier j to the tuner/demodulator, and the relevant service identifier i to the demultiplexer. The audio signal $A_i$ and video signal $V_i$ thus selected are then decoded and applied to a reproduction device (not shown).

Service information SI is applied to the control circuit for internal processing. If such information is to be displayed (for example, a menu or program guide), the control circuit applies the relevant data to a character generator 26 which generates an On-Screen-Display image OSD and applies this image to a mixer stage 25 for display on the screen.

In the present example, the receiver needs to be tuned to transport stream $TS_3$ for accessing the service information SI. Running an application such as a program guide which is transmitted via $TS_3$ prevents the receiver from receiving a television program which is transmitted in $TS_1$ or $TS_2$. It is only possible to simultaneously receive and reproduce services which are accommodated in the same transport stream, such as the television programs $S_7$ and $S_2$. By transmitting the audio signals $A_1 \ldots A_6$ in $TS_3$, the receiver can now at least reproduce the audio contents of the other programs. This allows him to leave the program guide and switch to TV reception when the audio signal signifies that, for example, a new TV program starts, or a goal is scored in a soccer match.

The duplication of audio signals in transport stream $TS_3$ requires a certain amount of bandwidth. Said bandwidth can be reduced by compressing the audio signals to obtain a low-quality version of the audio signal. In FIG. 1, this is shown by respective stages of an optional compression circuit 18.

The invention also provides a mechanism for linking the audio signals in transport stream $TS_3$ to the television programs from which they originate. The present DVB standard already includes a mechanism, a "linkage descriptor", to link additional information to a service. The linkage descriptor specifies, inter alia, the transport stream and service containing the additional information, and defines the linkage type. It is proposed to define one of the yet undefined linkage types so as to specify the additional information as a "replacement" service, and add such linkage descriptors to the relevant entries of the service description tables (SDT) already mentioned before. Applying this mechanism to the present example would yield a service description table as shown in the Table. It should be noted that the transport stream carrying the replacement service is included to comply with the linkage descriptor syntax already defined. In practice, the relevant transport stream is already known to the receiver, because it is the transport stream carrying the program guide.

| Service | | Replacement Service | |
|---|---|---|---|
| S | TS | S | TS |
| 1 | 1 | 9 | 3 |
| 2 | 1 | 10 | 3 |
| 3 | 1 | 11 | 3 |
| 4 | 2 | 12 | 3 |
| 5 | 2 | 13 | 3 |
| 6 | 2 | 14 | 3 |
| 7 | 3 | — | — |
| 8 | 3 | — | — |

The linking mechanism thus identifies the replacement audio signal which the receiver must reproduce when the user enters a program guide session. Conversely, the linking mechanism also identifies the TV program from which a replacement audio signal originates. This allows the receiver to switch to said TV program if the customer finishes the program guide session, even if the customer has selected a new replacement signal during the program guide session.

Figure 3:
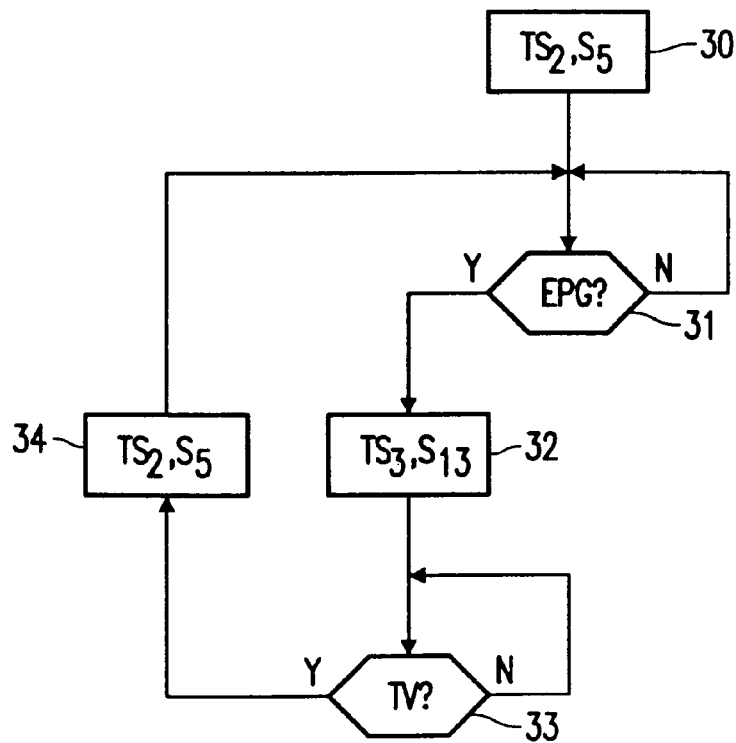
FIG. 3 shows a flow chart of operations which are carried out by a control processor which is shown in FIG. 2.

FIG. 3 shows a flow chart of operations which are carried out by the control processor 24 of the receiver. In a step 30, the receiver is tuned to a TV program, for example, service $S_5$ which is transmitted in transport stream $TS_2$. In a step 31, the customer enters a program guide session. In response thereto (step 32), the processor searches the entry of the current service in the service description table and finds that the replacement signal for the current service is service $S_{13}$ in $TS_3$. The tuner/demodulator and demultiplexer are then controlled to simultaneously receive and reproduce the program guide EPG and audio service $S_{13}$ in transport stream $TS_3$. Accordingly, the audio reproduction of service $S_5$ continues, possibly with a lower quality. In a step 33, the customer finishes the program guide session. In response thereto (step 34), the controller scans the service description table so as to determine to which TV program the receiver must return. Usually, this will be the same program as before. However, the invention allows the customer to select a different audio signal during the program guide session, and thereafter switch to the TV program from which the selected audio signal originates.

It is also envisaged to transmit replacement video signals in transport stream $TS_3$ instead of, or in addition to, replacement audio signals. In that case, a strong compression of said video signals in terms of spatial resolution (sub-sampling), temporal resolution (for example, I-pictures only) will be necessary in practice. The replacement video signal can be "PIP-ed" into the program guide.

In summary, a method and arrangement are disclosed for transmitting television programs via a plurality of channels, and an additional data service, for example, an Electronic Program Guide, via a selected television channel. While processing and displaying the program guide, prior art television receivers cannot continue the reproduction of a currently received TV program because the program is generally transmitted via a different channel. The invention provides a solution to this problem by duplicating a signal component representing, for example, the audio contents of the various television programs in said selected television channel. This allows customers to keep up with the service they were watching before, and to immediately return to the program if something of interest appears to happen. The invention is particularly applicable in Digital Video Broadcast (DVB) systems where each channel can accommodate a plurality of TV programs.

I claim:

1. A method of transmitting television programs via a plurality of channels, and for further transmitting additional data services via a selected television channel of said channels, said method comprising the steps of:
   transmitting said additional data services and a signal component of each of the television programs in said selected television channel, and
   transmitting data to identify, for each television program, the location of said signal components in said selected channel.

2. A method as claimed in claim 1, wherein the signal component is an audio signal representing the audio contents of the television program.

3. A method as claimed in claim 1, wherein the signal component is a video signal representing the video contents of the television program.

4. A method as claimed in claim 1, wherein the signal component is a reduced-quality version of the corresponding signal component of the television program.

5. A method of receiving television programs which are transmitted via a plurality of television channels, and for receiving additional data services transmitted via a selected channel of said channels, said method comprising the steps of:
   receiving, from said selected channel, said additional data services and signal components of each of said television programs,
   receiving data which identifies, for a selected television program, the location of said signal component of said television program in said selected channel, and
   simultaneously accessing said additional data service and reproducing the signal component disposed at said location.

6. An arrangement for transmitting television programs via a plurality of channels, and for transmitting additional data services via a selected television channel of said channels, said arrangement comprising:
   means for transmitting said additional data services and a signal component of each of the television programs in said selected television channel, and
   means for transmitting data to identify, for each television program, the location of said signal components in said selected channel.

7. An arrangement as claimed in claim 6, wherein the signal component is an audio signal representing the audio contents of the television program.

8. An arrangement as claimed in claim 6, wherein the signal component is a video signal representing the video contents of the television program.

9. An arrangement as claimed in claim 6, wherein the signal component is a reduced-quality version of the corresponding signal component of the television program.

10. A television receiver for receiving television programs which are transmitted via a plurality of television channels, and for receiving additional data services via a selected channel of said channels, said receiver comprising:
    means for receiving, from said selected channel, said additional data services and signal components of each of said television programs,
    means for receiving data which identifies, for a selected television program, the location of said signal component of said television programs in said selected channel, and
    means for simultaneously accessing said additional data service and reproducing the signal component disposed at said location.

* * * * *